W. E. COPITHORN.
DEMOUNTABLE RIM.
APPLICATION FILED JULY 9, 1919.
1,325,714.  Patented Dec. 23, 1919.
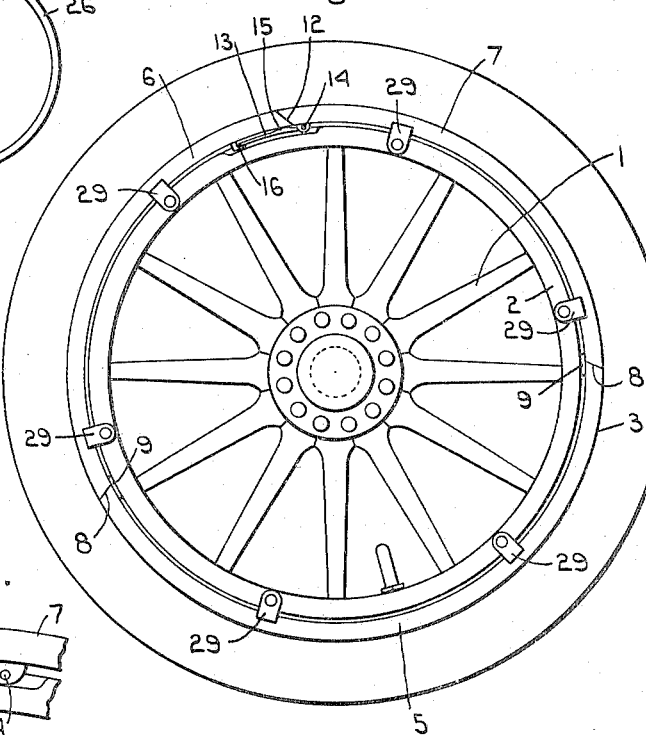
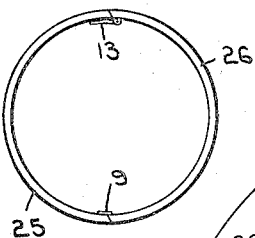
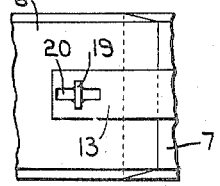
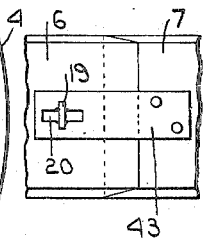
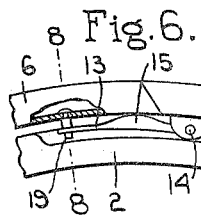
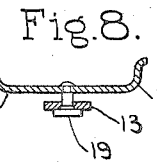
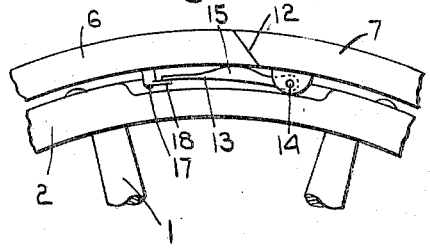
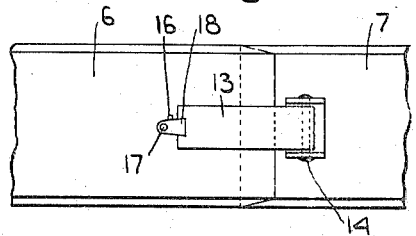
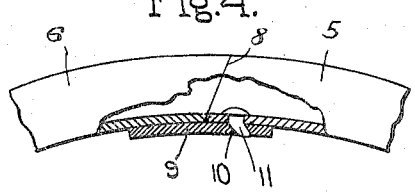
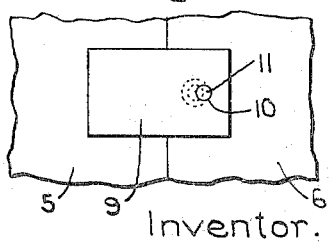
Inventor.
Walter E. Copithorn
by Heard Smith & Tennant
Attys.

UNITED STATES PATENT OFFICE.

WALTER E. COPITHORN, OF NATICK, MASSACHUSETTS.

DEMOUNTABLE RIM.

1,325,714.  Specification of Letters Patent.  Patented Dec. 23, 1919.

Application filed July 9, 1919. Serial No. 309,653.

*To all whom it may concern:*

Be it known that I, WALTER E. COPITHORN, a citizen of the United States, residing at Natick, county of Middlesex, State of Massachusetts, have invented an Improvement in Demountable Rims, of which the following description, in connection with the accompanying drawing, is a specification, like characters on the drawing representing like parts.

This invention relates to demountable rims and especially to demountable rims which are made in a plurality of sections separable from each other, and the object of the invention is to provide a novel demountable rim of this type which has certain novel features, all as will be more fully hereinafter set forth.

In order to give an understanding of my invention, I have illustrated in the drawings a selected embodiment thereof which will now be described, after which the novel features will be pointed out in the appended claims.

In the drawings, Figure 1 is a side view of a wheel having a rim embodying my invention;

Fig. 2 is an enlarged side view of a portion of the rim showing the means for locking two sections together;

Fig. 3 is an underside plan view of the portion of the rim shown in Fig. 2;

Fig. 4 is a view similar to Fig. 2 showing the form of lock used for connecting each of the short sections of the rim to the long section;

Fig. 5 is an underside plan view of the portion of the rim shown in Fig. 4;

Fig. 6 is a view similar to Fig. 2 showing a different embodiment of the invention;

Fig. 7 is an underside plan view of the portion of the rim shown in Fig 6;

Fig. 8 is a section on the line 8—8, Fig. 6;

Fig. 9 is a view showing a two-piece rim embodying my invention;

Fig. 10 is a view similar to Fig. 7 showing a different construction.

1 indicates a vehicle wheel having the usual felly 2, and 3 indicates the demountable rim embodying my invention to which the tire 4 is secured in any suitable way. The demountable rim, which may be either a clencher rim or straight side rim, comprises a plurality of sections so that the rim can be broken down to facilitate the removal of the tire therefrom. The rim may be made in any number of sections without departing from my invention, and in the drawings I have shown two constructions, one in which the rim is made of two sections, as seen in Fig. 9, and the other in which the rim is made in three sections. The three-piece rim is shown in Fig. 1, and it comprises the three sections 5, 6 and 7. The rim section 5 is longer than the rim sections 6 and 7, said section 5 extending a little less than half way around the wheel and having an opening therein to receive the valve stem of the tire. Each end of the section 5 is beveled or cut on an inclined line, as shown at 8, and the meeting ends of the rim sections 6 and 7 are cut so as to fit the inclined bevel surface 8. The rim sections 6 and 7 each have extending from one end thereof on its inner face a plate or extension 9 which is provided with an inclined aperture 10 situated beyond the end of the rim section 5, said aperture inclining inwardly and forwardly from the end of the rim section. The ends of the rim section 5 are each provided with an inclined locking projection 11 which enters the aperture 10. This locking projection can conveniently be formed by the end of a pin or stud 120 which is riveted in the rim section 6 or 7. The meeting ends of the rim sections 6 and 7 are preferably beveled, as shown at 12, so as to fit each other, and the rim section 7 has a locking lever 13 pivoted to the inside thereof at 14, said locking lever being provided between its ends with a protuberance 15 which is adapted to engage the inner face of the rim section 6 when the lever is in operative locking position. This locking lever 13 is held in its operative position shown in Figs. 2 and 6 by a suitable button which is preferably pivoted to the rim section 6 and is adapted to be swung into or out of engagement with said lever. In Figs. 2 and 3 this button is shown at 16 and it is pivoted to the rim section 6 at 17, said button having an overhanging lip 18 that is adapted to be swung over the end of the lever 13, as shown in Figs. 2 and 3, thereby to lock the lever in position. The turning of the button about its pivot through 180° will release it from the lever, as will be evident.

In Figs. 6 and 7 the button is indicated at 19 and has a general T shape. In this embodiment the lever 13 has a slot 20 therein through which the head of the button may pass when the button is turned in the right position, and after the head has passed through said slot the button may be turned so that the head extends transversely of the slot thereby locking the lever in position.

In order to remove the tire from the rim, the latter will be first removed from the wheel in the usual way and the locking lever 13 will then be unlocked by turning the button into the proper position. When the lever 13 is thus unlocked, the demountable rim may be broken down by swinging the meeting ends of the rim sections 6 and 7 inwardly. This frees the tire from the rim so that it can be readily removed.

To place a tire on the rim, the rim section 5 will first be put in position with the valve stem of the tire extending through the aperture in said rim section provided for this purpose. The rim sections 6 and 7 are then connected to the rim section 5, and this can easily be done by placing each inclined projection 11 at the entrance of the corresponding aperture 10 with the inner ends of the sections 6 and 7 situated toward the center of the rim, and then swinging the meeting ends of said sections 6 and 7 outwardly into their proper position. During this movement the projections 11 swing into the apertures 10. The locking lever 13 is then brought into operative position and locked by the button. The three sections of the rim are thus rigidly connected together and may be applied to the wheel in any usual way. In the drawings I have shown lugs 29 for securing the demountable rim to the wheel, but any appropriate means may be employed without departing from the invention.

The advantage of the inclined apertures 10 and inclined projections 11 is that when the meeting ends of the sections 6 and 7 are locked in their abutting relation the opposite ends of said rim sections cannot be disconnected from the rim section 5. The inclined position of the pin 11 and aperture 10 prevent any relative radial movement between the rim section 5 and the rim sections 6 and 7.

In Fig. 9 I have illustrated somewhat diagrammatically my invention as embodied in a two-piece rim. In this construction the rim is made of the two pieces 25 and 26 which are secured together at one end by the inclined projection 11 entering an aperture 10, as shown in Fig. 4, and at the other end with a locking lever 13.

In Fig. 10 I have shown a slightly different locking means. In this construction the rim section 7 has a plate 43 riveted thereto which is provided with a slot 20 adapted to receive a button 19 similar to the button shown in Fig. 7. In other respects the device shown in Fig. 10 is similar to that shown in Fig. 7.

I claim:—

1. A demountable rim made in sections, one of which has at its end an extension to overlie the inner face of the meeting end of an adjacent section, said extension being provided with an aperture which inclines inwardly and forwardly from the end of the rim section, and a pin extending inwardly and rearwardly from the inner face of the said meeting end of the adjacent section whereby said ends may be connected by placing the end of said pin at the entrance of the aperture while the sections are in broken relation, and then swinging the free end of said sections outwardly into their proper circular relation.

2. A demountable rim made in three sections, one of which is longer than the other two, means at each end of said longer section for connecting the same with the other sections, a locking lever pivoted to one of the shorter sections and provided with a protuberance to engage the inner face of the other shorter section, and a pivoted button carried by said latter shorter section and adapted to lock the lever in operative position.

In testimony whereof, I have signed my name to this specification.

Dr. WALTER E. COPITHORN.